United States Patent
Sata et al.

(10) Patent No.: US 11,416,584 B2
(45) Date of Patent: Aug. 16, 2022

(54) LICENSE MANAGEMENT SYSTEM, LICENSE MANAGEMENT METHOD, NON-TRANSITORY COMPUTER READABLE RECORDING MEDIUM STORING AND LICENSE MANAGEMENT PROGRAM

(71) Applicant: SHARP KABUSHIKI KAISHA, Sakai (JP)

(72) Inventors: Ichiko Sata, Sakai (JP); Rieko Toda, Sakai (JP); Shoji Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 232 days.

(21) Appl. No.: 16/900,423

(22) Filed: Jun. 12, 2020

(65) Prior Publication Data

US 2020/0410067 A1 Dec. 31, 2020

(30) Foreign Application Priority Data

Jun. 25, 2019 (JP) .............................. JP2019-117238

(51) Int. Cl.
*G06F 21/10* (2013.01)

(52) U.S. Cl.
CPC .... *G06F 21/105* (2013.01); *G06F 2221/0731* (2013.01); *G06F 2221/2117* (2013.01); *G06F 2221/2141* (2013.01)

(58) Field of Classification Search
CPC ........ G06F 21/10; G06F 21/105; G06F 21/12; G06F 21/121; G06F 2221/0731; G06F 2221/2117; G06F 2221/2135; G06F 2221/2137; G06F 2221/2141; H04L 2209/60; H04L 2209/603; H04L 2463/101
See application file for complete search history.

(56) References Cited

U.S. PATENT DOCUMENTS

2012/0130911 A1* 5/2012 Maclellan .............. G06Q 10/06
705/310
2013/0055414 A1 2/2013 Shibata et al.

FOREIGN PATENT DOCUMENTS

JP 2005-338979 A 12/2005
WO WO-2005025116 A2 * 3/2005 ........... G06F 21/105
WO 2011/135767 A1 11/2011

* cited by examiner

*Primary Examiner* — Kevin Bechtel
(74) *Attorney, Agent, or Firm* — ScienBiziP, P.C.

(57) ABSTRACT

A license management system subtracts, a number of rights corresponding to a number of users set by a number of users setter from a number of owned rights for each unit period, and uses a first unit period that is an earliest unit period, in which the number of owned rights is expected to be insufficient with respect to a number of rights in a unit period, as a last unit period, in which content can be used by a plurality of users, to set same expiration of a valid period for all of the plurality of users.

8 Claims, 13 Drawing Sheets

FIG. 2

USER INFORMATION (D1)

| USER ID | USER NAME | USE STATE (ENABLED/DISABLED) |
|---|---|---|
| 001 | A | ENABLED |
| 002 | B | ENABLED |
| 003 | C | ENABLED |
| 004 | D | ENABLED |
| 005 | E | ENABLED |
| 006 | F | ENABLED |
| 007 | G | ENABLED |
| 008 | H | ENABLED |
| 009 | I | ENABLED |
| 010 | J | ENABLED |
| 011 | K | DISABLED |
| 012 | L | DISABLED |
| 013 | M | DISABLED |
| 014 | N | DISABLED |
| 015 | O | DISABLED |

FIG. 3

| NTH MONTH | 1 | 2 | 3 | 4 | 5 | 6 | 7 | 8 | 9 | 10 | 11 | 12 |
|---|---|---|---|---|---|---|---|---|---|---|---|---|
| NUMBER OF USERS N2 | 10 | 10 | 10 | 10 | 10 | 10 | 10 | 10 | 10 | 10 | 10 | 10 |
| RIGHTS 1 TO 120 | 1 | 11 | 21 | 31 | 41 | 51 | 61 | 71 | 81 | 91 | 101 | 111 |
| | 2 | 12 | 22 | 32 | 42 | 52 | 62 | 72 | 82 | 92 | 102 | 112 |
| | 3 | 13 | 23 | 33 | 43 | 53 | 63 | 73 | 83 | 93 | 103 | 113 |
| | 4 | 14 | 24 | 34 | 44 | 54 | 64 | 74 | 84 | 94 | 104 | 114 |
| | 5 | 15 | 25 | 35 | 45 | 55 | 65 | 75 | 85 | 95 | 105 | 115 |
| | 6 | 16 | 26 | 36 | 46 | 56 | 66 | 76 | 86 | 96 | 106 | 116 |
| | 7 | 17 | 27 | 37 | 47 | 57 | 67 | 77 | 87 | 97 | 107 | 117 |
| | 8 | 18 | 28 | 38 | 48 | 58 | 68 | 78 | 88 | 98 | 108 | 118 |
| | 9 | 19 | 29 | 39 | 49 | 59 | 69 | 79 | 89 | 99 | 109 | 119 |
| | 10 | 20 | 30 | 40 | 50 | 60 | 70 | 80 | 90 | 100 | 110 | 120 |

VALID PERIOD

LAST MONTH (EXPIRATION)

| USER INFORMATION | | |
|---|---|---|
| USER ID | USER NAME | USE STATE (ENABLED/ DISABLED) |
| 001 | A | ENABLED |
| 002 | B | ENABLED |
| 003 | C | ENABLED |
| 004 | D | ENABLED |
| 005 | E | ENABLED |
| 006 | F | ENABLED |
| 007 | G | ENABLED |
| 008 | H | ENABLED |
| 009 | I | ENABLED |
| 010 | J | ENABLED |
| 011 | K | ENABLED |
| 012 | L | ENABLED |
| 013 | M | DISABLED |
| 014 | N | DISABLED |
| 015 | O | DISABLED |

FIG. 5

| NTH MONTH | 1 | 2 | 3 | 4 | 5 | 6 | 7 | 8 | 9 | 10 |
|---|---|---|---|---|---|---|---|---|---|---|
| NUMBER OF USERS N2 | 12 | 12 | 12 | 12 | 12 | 12 | 12 | 12 | 12 | 12 |
| RIGHTS 1 TO 120 | 1 | 13 | 25 | 37 | 49 | 61 | 73 | 85 | 97 | 109 |
|  | 2 | 14 | 26 | 38 | 50 | 62 | 74 | 86 | 98 | 110 |
|  | 3 | 15 | 27 | 39 | 51 | 63 | 75 | 87 | 99 | 111 |
|  | 4 | 16 | 28 | 40 | 52 | 64 | 76 | 88 | 100 | 112 |
|  | 5 | 17 | 29 | 41 | 53 | 65 | 77 | 89 | 101 | 113 |
|  | 6 | 18 | 30 | 42 | 54 | 66 | 78 | 90 | 102 | 114 |
|  | 7 | 19 | 31 | 43 | 55 | 67 | 79 | 91 | 103 | 115 |
|  | 8 | 20 | 32 | 44 | 56 | 68 | 80 | 92 | 104 | 116 |
|  | 9 | 21 | 33 | 45 | 57 | 69 | 81 | 93 | 105 | 117 |
|  | 10 | 22 | 34 | 46 | 58 | 70 | 82 | 94 | 106 | 118 |
|  | 11 | 23 | 35 | 47 | 59 | 71 | 83 | 95 | 107 | 119 |
|  | 12 | 24 | 36 | 48 | 60 | 72 | 84 | 96 | 108 | 120 |

VALID PERIOD

LAST MONTH (EXPIRATION)

FIG. 6

USER INFORMATION (D1)

| USER ID | USER NAME | USE STATE (ENABLED/DISABLED) |
|---|---|---|
| 001 | A | ENABLED |
| 002 | B | ENABLED |
| 003 | C | ENABLED |
| 004 | D | ENABLED |
| 005 | E | ENABLED |
| 006 | F | ENABLED |
| 007 | G | ENABLED |
| 008 | H | ENABLED |
| 009 | I | ENABLED |
| 010 | J | ENABLED |
| 011 | K | ENABLED |
| 012 | L | ENABLED |
| 013 | M | ENABLED |
| 014 | N | DISABLED |
| 015 | O | DISABLED |

FIG. 7

| NTH MONTH | 1 | 2 | 3 | 4 | 5 | 6 | 7 | 8 | 9 | 10 |
|---|---|---|---|---|---|---|---|---|---|---|
| NUMBER OF USERS N2 | 13 | 13 | 13 | 13 | 13 | 13 | 13 | 13 | 13 | 13 |
| RIGHTS 1 TO 120 | 1 | 14 | 27 | 40 | 53 | 66 | 79 | 92 | 105 | 118 |
| | 2 | 15 | 28 | 41 | 54 | 67 | 80 | 93 | 106 | 119 |
| | 3 | 16 | 29 | 42 | 55 | 68 | 81 | 94 | 107 | 120 |
| | 4 | 17 | 30 | 43 | 56 | 69 | 82 | 95 | 108 | 1 |
| | 5 | 18 | 31 | 44 | 57 | 70 | 83 | 96 | 109 | 2 |
| | 6 | 19 | 32 | 45 | 58 | 71 | 84 | 97 | 110 | 3 |
| | 7 | 20 | 33 | 46 | 59 | 72 | 85 | 98 | 111 | 4 |
| | 8 | 21 | 34 | 47 | 60 | 73 | 86 | 99 | 112 | 5 |
| | 9 | 22 | 35 | 48 | 61 | 74 | 87 | 100 | 113 | 6 |
| | 10 | 23 | 36 | 49 | 62 | 75 | 88 | 101 | 114 | 7 |
| | 11 | 24 | 37 | 50 | 63 | 76 | 89 | 102 | 115 | 8 |
| | 12 | 25 | 38 | 51 | 64 | 77 | 90 | 103 | 116 | 9 |
| | 13 | 26 | 39 | 52 | 65 | 78 | 91 | 104 | 117 | 10 |

VALID PERIOD

LAST MONTH (EXPIRATION)

SHORTAGE (NUMBER OF TEMPORARILY ISSUED RIGHTS K1)

FIG. 10

| NTH MONTH | 1 | 2 | 3 | 4 | 5 | 6 | 7 | 8 | 9 | 10 |
|---|---|---|---|---|---|---|---|---|---|---|
| NUMBER OF USERS N2 | 10 | 10 | 12 | 12 | 12 | 12 | 15 | 15 | 15 | 15 |
| RIGHTS 1 TO 120 | 1 | 11 | 21 | 33 | 45 | 57 | 69 | 84 | 99 | 114 |
| | 2 | 12 | 22 | 34 | 46 | 58 | 70 | 85 | 100 | 115 |
| | 3 | 13 | 23 | 35 | 47 | 59 | 71 | 86 | 101 | 116 |
| | 4 | 14 | 24 | 36 | 48 | 60 | 72 | 87 | 102 | 117 |
| | 5 | 15 | 25 | 37 | 49 | 61 | 73 | 88 | 103 | 118 |
| | 6 | 16 | 26 | 38 | 50 | 62 | 74 | 89 | 104 | 119 |
| | 7 | 17 | 27 | 39 | 51 | 63 | 75 | 90 | 105 | 120 |
| | 8 | 18 | 28 | 40 | 52 | 64 | 76 | 91 | 106 | 1 |
| | 9 | 19 | 29 | 41 | 53 | 65 | 77 | 92 | 107 | 2 |
| | 10 | 20 | 30 | 42 | 54 | 66 | 78 | 93 | 108 | 3 |
| | | | 31 | 43 | 55 | 67 | 79 | 94 | 109 | 4 |
| | | | 32 | 44 | 56 | 68 | 80 | 95 | 110 | 5 |
| | | | | | | | 81 | 96 | 111 | 6 |
| | | | | | | | 82 | 97 | 112 | 7 |
| | | | | | | | 83 | 98 | 113 | 8 |

VALID PERIOD — LAST MONTH (EXPIRATION)

SHORTAGE (NUMBER OF TEMPORARILY ISSUED RIGHTS K1)

FIG. 11

| NTH MONTH | 1 | 2 | 3 | 4 | 5 | 6 | 7 | 8 | 9 | 10 |
|---|---|---|---|---|---|---|---|---|---|---|
| NUMBER OF USERS N2 | 13 | 13 | 13 | 13 | 13 | 13 | 13 | 13 | 13 | 13 |
| RIGHTS 1 TO 120 | 1 | 14 | 27 | 40 | 53 | 66 | 79 | 92 | 105 | 118 |
| | 2 | 15 | 28 | 41 | 54 | 67 | 80 | 93 | 106 | 119 |
| | 3 | 16 | 29 | 42 | 55 | 68 | 81 | 94 | 107 | 120 |
| | 4 | 17 | 30 | 43 | 56 | 69 | 82 | 95 | 108 | 1 |
| | 5 | 18 | 31 | 44 | 57 | 70 | 83 | 96 | 109 | 2 |
| | 6 | 19 | 32 | 45 | 58 | 71 | 84 | 97 | 110 | 3 |
| | 7 | 20 | 33 | 46 | 59 | 72 | 85 | 98 | 111 | 4 |
| | 8 | 21 | 34 | 47 | 60 | 73 | 86 | 99 | 112 | 5 |
| | 9 | 22 | 35 | 48 | 61 | 74 | 87 | 100 | 113 | 6 |
| | 10 | 23 | 36 | 49 | 62 | 75 | 88 | 101 | 114 | 7 |
| | 11 | 24 | 37 | 50 | 63 | 76 | 89 | 102 | 115 | 8 |
| | 12 | 25 | 38 | 51 | 64 | 77 | 90 | 103 | 116 | 9 |
| | 13 | 26 | 39 | 52 | 65 | 78 | 91 | 104 | 117 | 10 |

VALID PERIOD

LAST MONTH (EXPIRATION)

SURPLUS (NUMBER OF STOCKED RIGHTS S1)

LICENSE MANAGEMENT SYSTEM, LICENSE MANAGEMENT METHOD, NON-TRANSITORY COMPUTER READABLE RECORDING MEDIUM STORING AND LICENSE MANAGEMENT PROGRAM

INCORPORATION BY REFERENCE

This application is based upon and claims the benefit of priority from the corresponding Japanese Patent Application No. 2019-117238 filed in Jun. 25, 2019, the entire contents of which are incorporated herein by reference.

BACKGROUND OF THE INVENTION

Field of the Invention

The present invention relates to a license management system, a license management method, and a non-transitory computer readable recording medium storing a license management program.

Description of the Background Art

Conventionally, a license management system that issues a license for a user to use content such as games, videos, and music to the users, and manages the authority to use the license by limiting the number of times of use and the period of use has been proposed.

For example, Japanese Unexamined Patent Application Publication No. 2005-338979 discloses, as a method for managing the authority to use a license according to the number of times of use, a system that sets, for users in a group, a number of license issuances for each content, and issues the license to the users in the group within the number of license issuances, when each content is registered by a content registration business that sells each content.

In addition, for example, as a method for managing the authority to use a license according to a use period, WO 2011/135767 discloses a download terminal that acquires content from a content server, acquires from a license server a writing-out license including a use condition for writing out the content to an exchangeable medium, and writes out the content to the exchangeable medium in accordance with the writing-out license, in which the writing-out license includes a pack identifier given to a content group to which the content belongs and viewing term information of the content, and in which a viewing time limit of the content is determined on the basis of the viewing term information.

As described in Japanese Unexamined Patent Application Publication No. 2005-338979, a license may be issued not to a specific individual but to a plurality of users in a specific group. However, in this case, the number of users who belong to the group is not always constant, and it is assumed that the number of users may change during the license period due to the replacement of users. Therefore, it is complicated to renew the license contract each time a user is replaced, and thus a license system adapted to the replacement of users is desired. In addition, when issuing licenses to users in the group, it is desirable to perform license management such as updating the licenses collectively in the group. However, the following problems occur in the conventional techniques.

For example, in the method for managing the authority to use a license by limiting the number of license issuances as in the technique of Japanese Unexamined Patent Application Publication No. 2005-338979, the number of license issuances for each content is set for the users in the group, the license is issued within the set number of license issuances, and the right is consumed in accordance with the number of license issuances. Therefore, even if the number of users belonging to the group changes fluidly due to the replacement of users during the license period, the rights are consumed according to an increase or decrease of users, and thus it is possible to adapt to the increase or decrease of users. However, this method has a problem that the timing when the license expires is unclear. For example, with this method, the license issuance ends when the number of license issuances reaches the set number of issuances. If the license is not updated by the end of the license, the subsequent issuance of the license is impossible at that point in time. The timing when the license ends changes depending on the usage amount of the license, and thus it is difficult to predict the timing when the license will end. In addition, with this method, if a period in which the content can be used is set for each license issuance, the timing when the license is issued varies among the users in the group, and thus the timing when the license ends will also vary among the users. As described above, the timing when the license ends is unclear, and thus there is a problem that it is difficult to collectively manage licenses in the group.

On the other hand, a method for managing the authority to use a license by limiting the period of use, such as the technique of WO 2011/135767, has an advantage that the tinning when the license ends is clear. However, if the number of users belonging to the group changes during the license period, for example, if the number of users increases, additional purchase of the license is required at that point in time. In addition, on the contrary, when the number of users decreases, the license will be wasted accordingly. In other words, the method of WO 2011/135767 cannot adapt to the increase or decrease of users.

An object of the present invention is to provide a license management system, a license management method, and a non-transitory computer readable recording medium storing a license management program that adapts to the replacement of a plurality of users in a group during a license period, and easily manages update and the like of a license when issuing the license to use content to the plurality of users in the group.

SUMMARY OF THE INVENTION

A license management system according to an aspect of the present invention is a license management system for managing licenses for a plurality of users in a group to use a content, and includes: a user information register that registers information of the plurality of users in the group, who use the content; a valid period setter that sets a valid period in which the plurality of users can use the content, on a basis of a preset unit period; a number of owned rights manager that manages a number of owned rights in the group based on a number of rights for one user of the plurality of users to use the content for the unit period; and a number of users setter that sets a number of the plurality of users who use the content in the unit period, on a basis of the information of the plurality of users registered by the user information register. The number of owned rights manager subtracts a number of rights corresponding to the number of the plurality of users set by the number of users setter from the number of owned rights for each unit period. The valid period setter uses a first unit period that is an earliest unit period, in which the number of owned rights is expected to be insufficient with respect to the number of rights in the unit period, as a last unit period, in which the content can be used by the plurality of users, to set same expiration of the valid period for all of the plurality of users.

A license management system according to another aspect of the present invention is a license management system for managing licenses for a plurality of users in a group to use content, and includes: a user information register that registers information of the plurality of users in the group, who use the content; a valid period setter that sets a valid period in which the plurality of users can use the content, on a basis of a preset unit period; a number of owned rights manager that manages a number of owned rights in the group based on a number of rights for one user of the plurality of users to use the content for the unit period; and a number of users setter that sets a number of the plurality of users who use the content in the unit period, on a basis of the information of the plurality of users registered by the user information register. The number of owned rights manager subtracts, a number of rights corresponding to the number of the plurality of users set by the number of users setter, from the number of owned rights for each unit period. The valid period setter uses, a second unit period which is the unit period immediately before a first unit period which is an earliest unit period in which the number of owned rights is expected to be insufficient with respect to the number of rights in the unit period, as a last unit period in which the content can be used by the plurality of users, to set same expiration of the valid period for all of the plurality of users.

A license management method according to another aspect of the present invention is a license management method for managing licenses for a plurality of users in a group to use content, and executes by one or more processors: setting a valid period in which the plurality of users in the group who use the content can use the content, on a basis of a preset unit period; managing a number of owned rights in the group based on a number of rights for one user of the plurality of users to use the content for the unit period; and setting a number of the plurality of users who use the content in the unit period, on a basis of the information of the plurality of users registered in advance. In the managing a number of owned rights, a number of rights corresponding to the number of the plurality of users set in the setting a number of the plurality of users is subtracted from the number of owned rights for each unit period. In the setting a valid period, a first unit period which is an earliest unit period in which the number of owned rights is expected to be insufficient with respect to the number of rights in the unit period, is used as a last unit period in which the content can be used by the plurality of users, to set same expiration of the valid period for all of the plurality of users.

A license management method according to another aspect of the present invention is a license management method for managing licenses for a plurality of users in a group to use content, and executes by one or more processors: setting a valid period in which the plurality of users in the group who use the content can use the content, on a basis of a preset unit period; managing a number of owned rights in the group based on a number of rights for one user of the plurality of users to use the content for the unit period; and setting a number of the plurality of users who use the content in the unit period, on a basis of the information of the plurality of users registered in advance. In the managing a number of owned rights, a number of rights corresponding to the number of the plurality of users set in the setting a number of the plurality of users is subtracted from the number of owned rights for each unit period. In the setting a valid period, a second unit period which is the unit period immediately before a first unit period which is an earliest unit period in which the number of owned rights is expected to be insufficient with respect to the number of rights in the unit period, is used as a last unit period in which the content can be used by the plurality of users, to set same expiration of the valid period for all of the plurality of users.

A non-transitory computer readable recording medium storing a license management program according to another aspect of the present invention is a license management program for managing licenses for a plurality of users in a group to use content, and the license management program causes one or more processors to execute: setting a valid period in which the plurality of users in the group who use the content can use the content, on a basis of a preset unit period; managing a number of owned rights in the group based on a number of rights for one user of the plurality of users to use the content for the unit period; and setting a number of the plurality of users who use the content in the unit period, on a basis of the information of the plurality of users registered in advance. In the managing a number of owned rights, a number of rights corresponding to the number of the plurality of users set in the setting a number of the plurality of users is subtracted from the number of owned rights for each unit period. In the setting a valid period, a first unit period which is an earliest unit period in which the number of owned rights is expected to be insufficient with respect to the number of rights in the unit period, is used as a last unit period in which the content can be used by the plurality of users, to set same expiration of the valid period for all of the plurality of users.

A non-transitory computer readable recording medium storing a license management program according to another aspect of the present invention is a license management program for managing licenses for a plurality of users in a group to use content, and the license management program causes one or more processors to execute: setting a valid period in which the plurality of users in the group who use the content can use the content, on a basis of a preset unit period; managing a number of owned rights in the group based on a number of rights for one user of the plurality of users to use the content for the unit period; and setting a number of the plurality of users who use the content in the unit period, on a basis of the information of the plurality of users registered in advance. In the managing a number of owned rights, a number of rights corresponding to the number of the plurality of users set in the setting a number of the plurality of users is subtracted from the number of owned rights for each unit period. In the setting a valid period, a second unit period which is the unit period immediately before a first unit period which is an earliest unit period in which the number of owned rights is expected to be insufficient with respect to the number of rights in the unit period, is used as a last unit period in which the content can be used by the plurality of users, to set same expiration of the valid period for all of the plurality of users.

According to the present invention, when a license to use content is issued to a plurality of users in a group, it is possible to adapt to the replacement of the plurality of users in the group during the license period and to easily manage update and the like of the license.

BRIEF DESCRIPTION OF THE DRAWINGS

FIG. 2 is a diagram illustrating an example of user information used in the license management system according to the embodiment of the present invention.

FIG. 3 is a schematic diagram illustrating how licenses are consumed in the license management system according to the embodiment of the present invention.

FIG. 4 is a diagram illustrating an example of user information used in the license management system according to the embodiment of the present invention.

FIG. 5 is a schematic diagram illustrating how licenses are consumed in the license management system according to the embodiment of the present invention.

FIG. 6 is a diagram illustrating an example of user information used in the license management system according to the embodiment of the present invention.

FIG. 7 is a schematic gram illustrating how licenses are consumed in the license management system according to the embodiment of the present invention.

FIG. 10 is a schematic diagram illustrating how licenses are consumed in the license management system according to the embodiment of the present invention.

FIG. 11 is a schematic diagram illustrating how licenses are consumed in the license management system according to the embodiment of the present invention.

DESCRIPTION OF THE PREFERRED EMBODIMENTS

Hereinafter, embodiments of the present invention will be described with reference to the accompanying drawings to provide an understanding of the present invention. The following embodiments are examples embodying the present invention and does not limit the technical scope of the present invention.

License Management System 100

Figure 1:
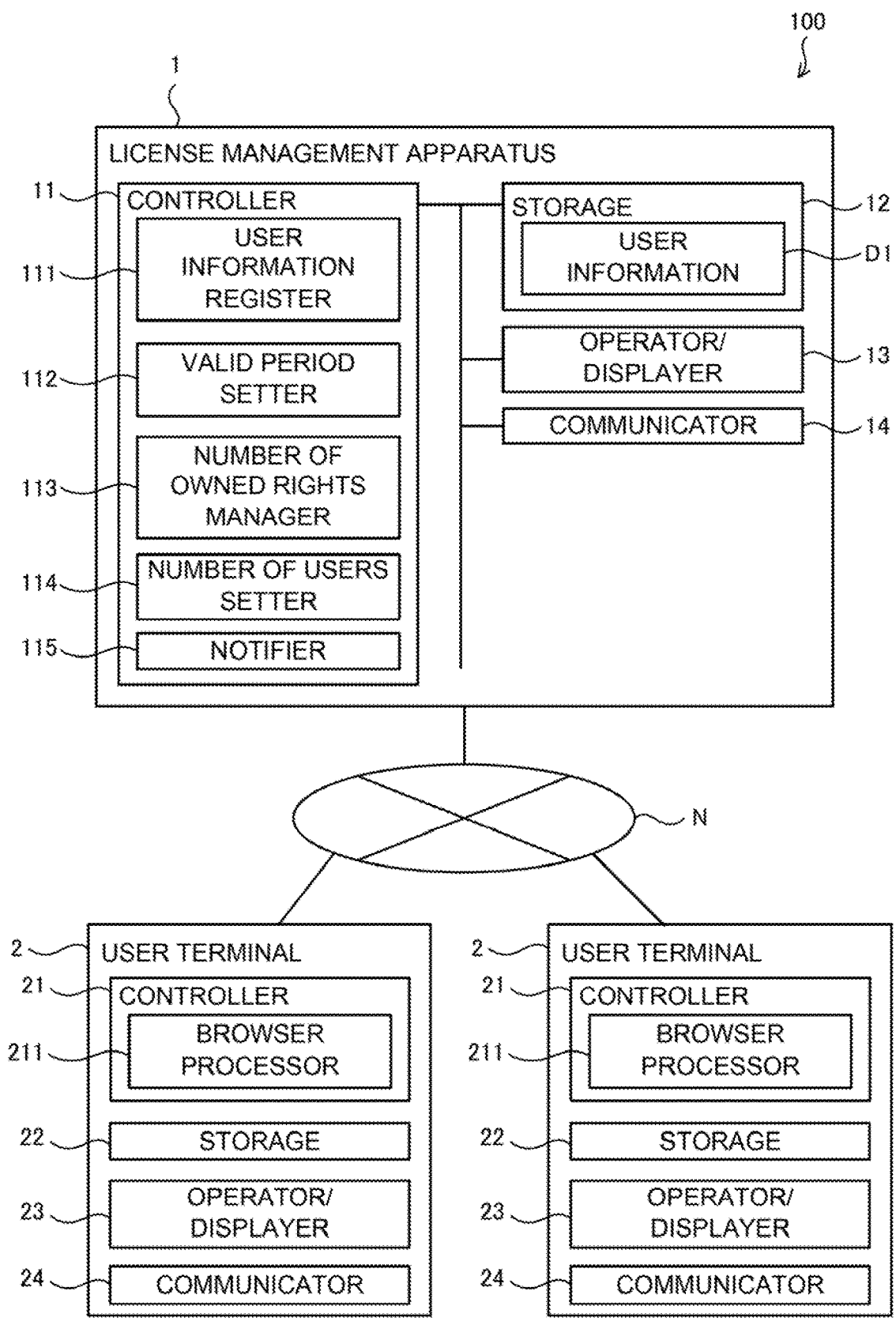
FIG. 1 is a block diagram illustrating a configuration of a license management system according to an embodiment of the present invention.

As illustrated in FIG. 1, a license management system 100 according to an embodiment of the present invention includes a license management apparatus 1 and one or more user terminals 2. The license management apparatus 1 and the user terminals 2 can communicate via a communication network N such as the Internet, a local area network (LAN), a wide area network (WAN), or a public telephone line. The license management system 100 manages licenses for a plurality of users in a group to use content.

The license management apparatus 1 is an information processing apparatus that issues, to a user, a license for the user to use content such as games, videos, and music on the user terminals 2, and manages the authority to use the license by limiting the number of times of use and the period of use. The user terminals 2 are information processing devices that can be operated by the user to execute games and play video and music. The user terminals 2 are information processing devices such as a mobile phone, a smart phone, a tablet terminal, or a personal computer. In the license management system 100, the license management apparatus 1 may provide the content to the user terminals 2, or a content server (not illustrated) connected to the communication network N may provide the content to the user terminals 2.

In the present embodiment, the single license management apparatus 1 corresponds to the license management system according to the present invention. However, the license management system according to the present invention may include one or more components of the license management apparatus 1 and the user terminal 2. For example, when the components of the license management apparatus 1 and the user terminal 2 cooperate to execute various license management processes (see FIG. 8 etc.) that will be described later, it is possible to regard a system including a plurality of components that execute the processes as the license management system according to the present invention. For example, the license management apparatus 1 and the user terminal 2 may constitute the license management system according to the present invention.

License Management Apparatus 1

As illustrated in FIG. 1, the license management apparatus 1 is a server including a controller 11, a storage 12, an operator/displayer 13, a communicator 14, and the like. The license management apparatus 1 is not limited to one computer, but may be a computer system in which a plurality of computers cooperate. In addition, various kinds of processes executed by the license management apparatus 1 may be distributed and executed by one or a plurality of processors.

The communicator 14 connects the license management apparatus 1 to the communication network N by wire or wirelessly, and is a communication interface to perform data communication with an external device such as the user terminal 2 via the communication network N in accordance with a predetermined communication protocol.

The operator/displayer 13 is a user interface including a displayer such as a liquid crystal display or an organic electroluminescent (EL) display that displays various types of information and an operator such as a mouse, a keyboard, or a touch panel that receives an operation.

The storage 12 is a non-volatile storage such as a hard disk drive (HDD) or a solid state drive (SSD) that stores various types of information. Specifically, the storage 12 stores data such as user information D1. In addition, the storage 12 also stores the data and the like of the content. The user information D1 is information about a user who has the authority to use the content. FIG. 2 is a diagram illustrating an example of the user information D1.

As illustrated in FIG. 2, the user information D1 includes information such as a "user identification (ID)", a "user name", and a "use state" for each user who has the authority to use the content. The "user ID" is the identification information of a user. The "user name" is the name of the user. The "use state" is information that indicates whether the authority to use the content is "enabled" or "disabled". For example, the user or an administrator inputs various information on a user information registration screen (not illustrated) displayed on the license management apparatus 1 or the user terminal 2, and various information is thereby registered in the user information D1. For example, when the information of a plurality of users who use a facility for the elderly is input in the user information registration screen, the information of the plurality of users is registered in the user information D1. In this case, the information of user information D1 may be the same as the information of the residents of the facility for the elderly.

In the user information D1, the "use state" is set to "enabled" or "disabled" by the user or the administrator selecting. For example, if the user wants to use the content, the "use state" is set to "enabled" on a setting screen (not illustrated). On the other hand, for example, if the user does not want to use the content, the "use state" is set to "disabled" on the setting screen (not illustrated). A group is composed of a plurality of users whose "use state" is set to "enabled". In the user information D1 illustrated in FIG. 2, 15 users A to O are registered. The "use states" of 10 users A to J among the registered users are set to "enabled", and the "use states" of 5 users K to O are set to "disabled". In this case, the users A to J constitute the group. In the present embodiment, the license to use the content is issued to the group, for example, by the purchase operation by the administrator. The controller 11 registers various information in the user information D1 and updates various information of the user information D1 due to an increase or decrease of users and change of use state.

As another embodiment, part or all of the information such as the user information D1 may be stored in another server accessible from the license management apparatus 1 via the communication network N. In this case, the controller 11 of the license management apparatus 1 may acquire the information from the server and execute various processes such as a license management process (see FIG. 8, etc.) that will be described later.

In addition, the storage 12 also stores image data such as the user information registration screen, the setting screen, and a purchase screen for purchasing a license displayed on the license management apparatus 1 or the user terminal 2. For example, the administrator inputs necessary information on the purchase screen and purchases a plurality of licenses to use the content in the group. Moreover, if the license management apparatus 1 has the function of providing the content, the storage 12 also stores the data of a web page or the like, corresponding to the content.

Furthermore, the storage 12 stores a control program such as a license management program for causing the controller 11 to execute a license management process (see FIG. 8, etc.) described later. For example, the license management program is non-temporarily recorded on a computer-readable recording medium such as a compact disc (CD) or a digital video disc (DVD), and is read by a reader (not illustrated) such as a CD drive or a DVD drive included in the license management apparatus 1 and stored in the storage 12.

The controller 11 includes control devices such as a central processing unit (CPU), a read-only memory (ROM), and a random-access memory (RAM). The CPU is a processor that executes various arithmetic processes. The ROM is a non-volatile storage in which control programs such as a basic input/output system (BIOS) and an operating system (OS) for causing the CPU to execute various arithmetic processes are stored in advance. The RAM is a volatile or non-volatile storage that stores various information, and is used as a temporary storage memory (work area) for various processes executed by the CPU. The controller 11 controls the license management apparatus 1 by executing, on the CPU, various control programs stored in advance in the ROM or the storage 12.

The controller 11 manages the license purchased for the group. For example, the controller 11 manages a valid period in which the content can be used by the license and the expiration of the valid period. Here, the license is the right to use the content (use right), and if one license (right) is purchased, one user can continue to use the content for a unit period (for example, one month). One license becomes already used (consumed) when the unit period ends. The way of selling the license is not limited to selling the license one by on small units, but the license may be sold in the form of collectively selling (packaging) in units of a predetermined standard number of users to use the content for a predetermined standard use period.

The following describes a case where 10 users A to J as a standard number of users purchase 120 licenses as licenses to use the content for 12 months as a standard use period. If the user information D1 is in the state illustrated in FIG. 2, since the group includes 10 users A to J, for example, the administrator purchases 120 licenses (rights) for the group. The purchased 120 licenses are consumed as follows. FIG. 3 is a diagram schematically illustrating how the licenses are consumed. Here, since 120 licenses were purchased, the number of licenses owned by the group (hereinafter referred to as a "number of owned rights N1") is "120". In addition, the number of users who can use the content (hereinafter referred to as a "number of users N2") is "10". In FIG. 3, for convenience of explanation, numbers 1 to 120 are assigned to 120 licenses. For example, in a primary 1st month of using the content, each license with number 1 to 10 is assigned to each user A to J, and each user A to J thereby can use the content for one month that is the 1st month (unit period). Moreover, in a 2nd month, each license with number 11 to 20 is assigned to each user A to J, and each user A to J thereby can use the content for one month that is the 2nd month. In this way, the licenses for the number of users N2 are consumed from the number of owned rights N1 every unit period (one month). In the example illustrated in FIG. 3, in the 12th month, each license number with 111 to 120 is consumed by each user A to J, and all licenses are thereby consumed. As a result, each user A to J can use the content for 12 months. As described above, if the number of standard users does not change from the initial state during the license period, users can use the content during the standard use period. That is, in such a case, the standard use period assumed when purchasing the license and a valid use period that is the actual use period are the same period.

Furthermore, as another example different from the above example, the following describes a case where 12 users A to L are included as the standard number of users and 120 licenses are purchased as in the above example. This case is equivalent to a case where licenses are purchased for 12 users A to L as the standard number of users to use the content for 10 months as the standard use period. As illustrated in FIG. 4, if the use states of users A to L are set to "enabled" and the group includes 12 users A to L, the purchased 120 licenses are consumed as illustrated in FIG. 5. That is, 12 licenses are consumed in each month from the 1st month to the 10th month. Therefore, in the 10th month, each license number with 109 to 120 is consumed by each user A to L, and all licenses are thereby consumed. As a result, each user A to L, can use the content for 10 months.

As described above, the number of users N2 is subtracted from the number of owned rights N1 for each unit period to calculate the last month (expiration) when all licenses are consumed. As a result, the valid period of the license is obtained. For example, the number of owned rights N1 in each month after the 1st month is calculated as of the 1st month, the valid period and the expiration of the valid period of all licenses for the group can be obtained as of the 1st month. In addition, same expiration of the valid period (12th month in FIG. 3) is set for all users in the group.

Meanwhile, as illustrated in FIG. 3 and FIG. 5, if the number of owned rights N1 is divisible by the number of users N2, that is, if there is no remainder as a result of N1/N2, the expiration of the valid period is the same for all users. On the other hand, if the number of owned rights N1 is not divisible by the number of users N2, that is, if there is a remainder as a result of N1/N2, the expiration of the valid period not the same for all users, and the expiration varies among users.

For example, as illustrated in FIG. 6, when the use states of users A to M are set to "enabled" and 13 users A to M are included in the group, N1/N2 is not divisible and there is a remainder (quotient=9, remainder=3). In this case, as illustrated in FIG. 7, for the purchased 120 licenses, for example, users A to C can use the content from the 1st month to the 10th month, and users D to M can use the content from the 1st month to the 9th month. However, the license for the 10th month is not allocated, and the content cannot be used in the 10th month. In other words, there is a shortage of licenses in the 10th month. As described above, the use period and the expiration vary among users.

Accordingly, in the license management apparatus 1 according to the present embodiment, the controller 11 executes a process for avoiding variations in the use period and expiration among users. The specific configuration of the controller 11 will be described below.

As illustrated in FIG. 1, the controller 11 includes various processors such as a user information register 111, a valid period setter 112, a number of owned rights manager 113, a number of users setter 114, and a notifier 115. The controller 11 functions as the various processors by executing various processes according to the license management program on the CPU. In addition, some or all of the processors may include an electronic circuitry. The license management program may be a program for allowing a plurality of processors to function as the processors.

The user information register 111 registers information of a plurality of users in the group who use the content in the user information D1 (see FIG. 2) of the storage 12. The user information register 111 is an example of the user information register of the present invention. Specifically, when the user or the administrator inputs various information (a user ID, a user name, a use state, etc.) on the user information registration screen displayed on the license management apparatus 11 or the user terminal 2, the user information register 111 acquires various information that has been input and registers the information in the user information D1. In addition, when the user or the administrator performs an operation to change the use state ("enabled" or "disabled") on the user information registration screen, the user information register 111 acquires the operation information and updates the use state of the user information D1.

The valid period setter 112 sets a valid period in which the plurality of users of the group can use the content, on the basis of a preset unit period. The valid period setter 112 is an example of the valid period setter of the present invention. The unit period is, for example, a period in which one user can continue to use the content with one license (right), and is set to, for example, "one month". The valid period is a period in which all licenses purchased for the group are consumed by the users of the group.

The number of owned rights manager 113 manages the number of owned rights N1 of the group based on the number of rights (the number of licenses) for one user of the plurality of users of the group to use the content for the unit period. The number of owned rights manager 113 is an example of the number of owned rights manager of the present invention. Here, the number of rights for one user to use the content for the unit period is set to "1". That is, one license allows one user to continue to use the content for the unit period.

The number of users setter 114 sets the number of users (the number of users N2) who use the content in the unit period, on the basis of the information of the user registered by the user information register 111. The number of users setter 114 is an example of the number of users setter of the present invention. Specifically, the number of users setter 114 calculates the number N2 of users whose use state of the user information D1 is set to "enabled". For example, in the case of the user information D1 illustrated in FIG. 3, the number of users setter 114 sets the number of users N2 to "10". In addition, for example, in the case of the user information D1 illustrated in FIG. 4, the number of users setter 114 sets the number of users N2 to "12". Moreover, for example, in the case of the user information D1 illustrated in FIG. 6, the number of users setter 114 sets the number of users N2 to "13".

Here, the number of owned rights manager 113 subtracts, a number of rights corresponding to the number of users N2 set by the number of users setter 114, from the number of owned rights N1 for each unit period. For example, if the number of owned rights N1 is "120" and the number of users N2 is "13" (see FIG. 7) at the time of license purchase, the number of owned rights manager 113 subtracts "13" from the number of owned rights N1 for each unit period "one month" (N1–N2). The number of owned rights N1 is updated by the subtraction process for each unit period.

In addition, the valid period setter 112 uses, an earliest unit period (corresponding to the first unit period of the present invention) in which the number of owned rights N1 is expected to be insufficient with respect to the number of licenses (the number of users N2) used in the unit period, as a last unit period in which the content can be used by the plurality of users, to set same expiration of the valid period for all of the plurality of users. In the example illustrated in FIG. 7, if "13" is subtracted from the number of owned rights N1 (N1–N2) for each unit period "one month", there is a shortage of 10 licenses in the 10th month. In this case, the valid period setter 112 sets the period from the 1st month to the 10th month to the valid period, and sets the 10th month to the last month (expiration) of the valid period.

Moreover, when the license is insufficient at the expiration, the number of owned rights manager 113 temporarily issues licenses for the insufficient number of rights (hereinafter referred to as "a number of temporarily issued rights K1"). In the example illustrated in FIG. 7, 10 licenses are insufficient in the 10th month that is the expiration, and thus the number of owned rights manager 113 temporarily issues 10 licenses. In addition, when a new license for the group is purchased and the number of rights is newly added, the number of owned rights manager 113 subtracts a number of temporarily issued rights K1 corresponding to the temporarily issued licenses from a number of the added rights. For example, if 120 licenses are newly added to the group, the number of owned rights manager 113 subtracts the number of temporarily issued rights K1 "10" from "120". As a result, the number of owned rights manager 113 sets "110" as the number of owned rights N1 as of the 11th month and executes a consumption process of the license after the 11th month.

The notifier 115 notifies the license management apparatus 1 or the user terminal 2 of information indicating that licenses for the insufficient number of the rights have been temporarily issued or information for prompting addition (for example, purchase) of new licenses (rights) to use the content when licenses for the insufficient number of the rights (number of temporarily issued rights K1) are temporarily issued by the number of owned rights manager 113. The notifier 115 is an example of the first notifier of the present invention.

User Terminal 2

As illustrated in FIG. 1, the user terminal 2 includes a controller 21, a storage 22, an operator/displayer 23, a communicator 24, and the like. The user terminal 2 is an information processing device such as a mobile phone, a smart phone, a tablet terminal, or a personal computer.

The communicator 24 connects the user terminal 2 to the communication network N by wire or wirelessly, and is a communication interface to perform data communication with an external apparatus such as the license management apparatus 1 via the communication network N in accordance with a predetermined communication protocol.

The operator/displayer 23 is a user interface including a displayer such as a liquid crystal display or an organic EL display that displays various types of information such as web pages and an operator such as a mouse, a keyboard, or a touch panel that receives an operation.

The storage 22 is a non-volatile storage such as an HDD, an SSD, or a flash memory that stores various information. For example, the storage 22 stores a control program such as a browser program. Specifically, the browser program is a control program for causing the controller 21 to perform a communication process with an external apparatus such as the license management apparatus 1 in accordance with a communication protocol such as a hypertext transfer protocol (HTTP). In addition, the browser program may be a dedicated application for executing a communication process with the license management apparatus 1 in accordance with a preset communication protocol.

The controller 21 includes control devices such as a CPU, a ROM, and a RAM. The CPU is a processor that executes various arithmetic processes. The ROM is a non-volatile storage in which control programs such as BIOS and OS for causing the CPU to execute various processes are stored in advance. The RAM is a volatile or non-volatile storage that stores various information, and is used as a temporary storage memory (work area) for various processes executed by the CPU. The controller 21 controls the user terminal 2 by executing, on the CPU, various control programs stored in advance in the ROM or the storage 22.

Specifically, the controller 21 functions as a browser processor 211 by executing various processes in accordance with the browser program stored in the storage 22. The browser processor 211 can display, on the operator/displayer 23, a web page provided from the license management apparatus 1 via the communication network N, and can execute a browser process for inputting an operation on the operator/displayer 23 to the license management apparatus 1. That is, the user terminal 2 can function as the operation terminal of the license management apparatus 1 by the controller 21 executing the browser program. Some or all of the processors included in the controller 21 may include an electronic circuitry.

For example, in the user terminal 2, when a user operation for making an access request to a predetermined uniform resource locator (URL) corresponding to a game site provided by the license management system 100 is performed, the controller 21 acquires the data of the web page of the game site from the license management apparatus 1 and displays the web page of the game site on the operator/displayer 23. For example, when the user inputs a user ID on a login screen displayed on the user terminal 2, the license management apparatus 1 authenticates a license corresponding to the user ID, and then transmits the data of the web page of the game site, to the user terminal 2. When a dedicated application corresponding to the license management apparatus 1 is installed on the user terminal 2, the user of the user terminal 2 operates the dedicated application, and the web page of the game site is thereby displayed on the operator/displayer 23. The user can execute a game on the game site on the basis of the valid period of the license by operating the user terminal 2.

License Management Process

Figure 8:
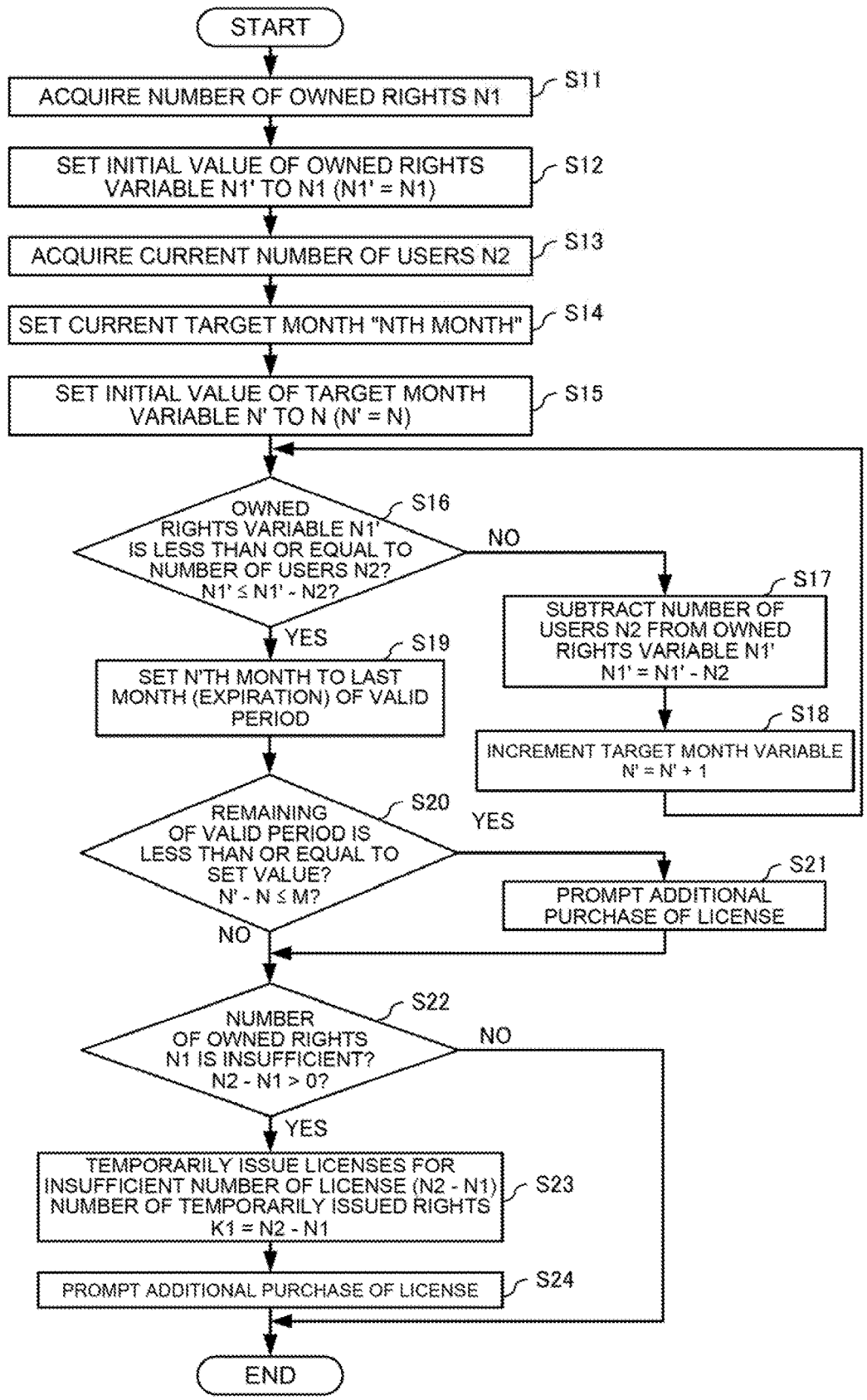
FIG. 8 is a flowchart for explaining an example of a procedure of a license management process in the license management system according to the embodiment of the present invention.

Hereinafter, a license management process executed in the license management system 100 will be described with reference to FIGS. 8 and 9. Specifically, in the present embodiment, the license management process is performed by the controller 11 of the license management apparatus 1. In addition, the controller 11 repeatedly executes the license management process every predetermined period. For example, the controller 11 repeatedly executes the license management process every unit period (for example, one month), which is a period in which one user can use the content by one license.

The present invention can be understood as an invention of a content management method for executing one or more steps included in a content management process. In addition, one or more steps included in the content management process described here may be omitted as appropriate. The execution order of each step in the content management process may be different within a range where the same effect is exhibited. Furthermore, here, a case where each step in the content management process is executed by the controller 11 will be described as an example; however, a content management method in which each step in the content management process is distributed and executed by a plurality of processors can be considered as another embodiment.

First, in step S11, the controller 11 acquires a current total number of licenses (the number of owned rights N1) purchased for the group including a plurality of users who use the content. In the abovementioned example (see FIG. 7), the controller 11 acquires "120" as the number of owned rights N1. If the present time is the 2nd month, the controller 11 acquires "107" as the number of owned rights N1.

Next, in step S12, the controller 11 sets the value of N1 as the initial value of an owned rights variable N1' (N1'=N1). The owned rights variable N1' is a variable set for use in the following calculations.

Next, in step S13, the controller 11 acquires a current number of users N2. For example, the controller 11 refers to the user information D1 illustrated in FIG. 6, and acquires the number of users "13" whose use state is set to "enabled" as the number of users N2. Step S13 is an example of the setting a number of users of the present invention.

Next, in step S14, the controller 11 sets a current target month. For example, if the present time is the primary month to use the purchased license, the target month is set to the 1st month (n=1). In addition, for example, the present time is the next month of the 1st month, the target month is set to the 2nd month (n=2).

Next, in step S15, the controller 11 sets the value of n as the initial value of a target month variable n' (n'=n). The target month variable n' is a variable set for use in the following calculations.

Next, in step S16, the controller 11 determines whether the owned rights variable N1' is less than or equal to the number of users N2. If it is determined that the owned rights variable N1' is more than the number of users N2 (S16: NO), the process proceeds to step S17. On the other hand, if it is determined that the owned rights variable N1' is less than the number of users N2 (S16: YES), the process proceeds to step S19.

In step S17, the controller 11 subtracts the number of users N2 from the owned rights variable N1'. For example, if the target month is the 1st month (n=1), the controller 11 subtracts the number of users N2 "13" from the owned rights variable N1' "120" and updates the owned rights variable N1' to "107". Step S17 is an example of the managing a number of owned rights of the present invention.

Next, in step S18, the controller 11 sets the target month variable n' to the next month. That is, the controller 11 increments the "target month variable n'" to the "target month variable n'+1". For example, if the target month variable is the 1st month (n'=1), the controller 11 sets the target month to the 2nd month (n'=2). After that, the process returns to step S16. Upon returning to step S16, the controller 11 determines whether the updated owned rights variable N1' is less than or equal to the number of users N2. The controller 11 repeats the process of steps S16 to S18 until it is determined that the updated owned rights variable N1' is less than or equal to the number of users N2. In the example illustrated in FIG. 7, if the target month is the 10th month, the remaining number of owned rights N1 is "3". Therefore, the controller 11 determines that the number of owned rights N1 "3" is less than or equal to the number of users N2 "13" in step S16.

In step S19, the controller 11 sets a month corresponding to the target month variable n' to the last month (expiration) of the valid period of the license. In the above example, the controller 11 sets the 10th month (n'=10) is set as the last month (expiration). Step S19 is an example of the setting a valid period of the present invention.

Next, in step S20, the controller 11 determines whether a difference value obtained by subtracting the target month n from the target month variable n' is less than or equal to a preset notification set value m (n'−n≤m). Here, the notification set value m is a set value for setting whether to perform notification when how much the remaining use period decreases. If it is determined that the difference value obtained by subtracting the target month n from the target month variable n' is less than or equal to the preset notification set value m (n'−n≤m) (S20: YES), that is, if the remaining use period is less than or equal to the set value, the process proceeds to step S21, On the other hand, if it is determined that the difference value obtained by subtracting the target month n from the target month variable n' is more than the preset notification set value (n'−n>m) (S20: NO), that is, if the remaining use period is more than the set value, the process proceeds to step S22. That is, in this case, the process skips the next step S21 and proceeds to the next step S22.

Next, in step S21, the controller 11 urges the user or the administrator to additionally purchase a new license to use the content. For example, the controller 11 causes the license management apparatus 1 or the user terminal 2 to notify (for example, display) a message prompting the additional purchase of the license.

Next, in step S22, the controller 11 determines whether the number of owned rights N1 is insufficient. If it is determined that the number of owned rights N1 is insufficient (S22: YES), that is, if the number of owned rights N1 is less than the number of users N2, the process proceeds to step S23. On the other hand, if it is determined that the number of owned rights N1 is not insufficient (S22: NO), that is, if the number of owned rights N1 is more than or equal to the number of users N2 (see FIGS. 3 and 5), the process ends.

In step S23, the controller 11 temporarily issues licenses for an insufficient number of the license (number of temporarily issued rights K1=N2−N1). In the above example, the controller 11 temporarily issues 10 (K1=10) licenses.

Next, in step S24, the controller 11 urges the user or the administrator to purchase a new license to use the content. For example, the controller 11 causes the license management apparatus 1 or the user terminal 2 to notify (for example, display) a message prompting the additional purchase of the license. In step S24, a message different from that of the notification in step S20 may be notified. In addition, when the notification in step S20 and the notification in step S24 duplicate, one of them may be performed, or both notifications may be redundantly performed.

Figure 9:
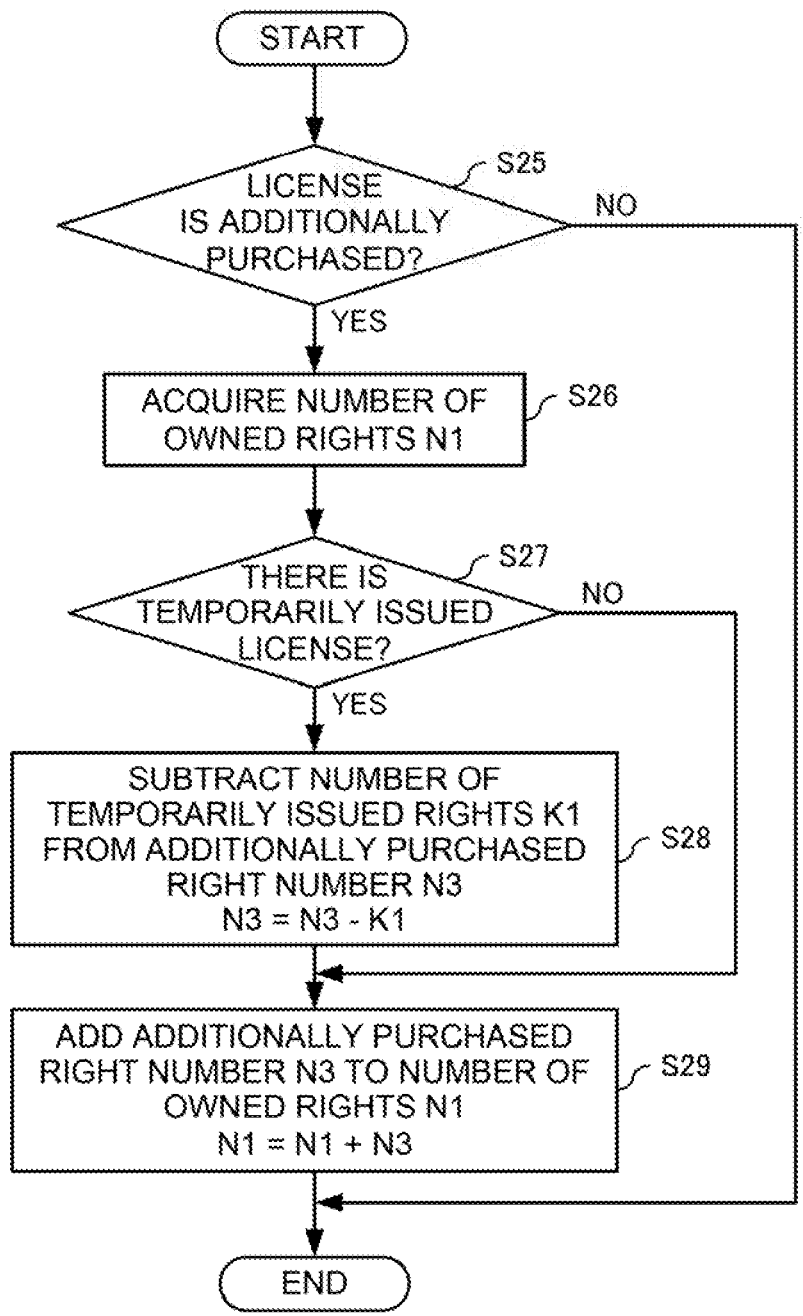
FIG. 9 is a flowchart for explaining an example of a procedure of a license management process in the license management system according to the embodiment of the present invention.

Here, if the license to use the content is additionally purchased, the controller 11 may execute the process illustrated in FIG. 9, for example.

First, in step S25, the controller 11 determines whether the license is additionally purchased. If it is determined that the license is additionally purchased (S25: YES), the process proceeds to step S26. On the other hand, if it is determined that the license is not additionally purchased (S25: NO), the process ends.

In step S26, the controller 11 acquires a current number of owned rights N1.

Next, in step S27, the controller 11 determines whether there is a temporarily issued license. For example, in step S23 in FIG. 8, if the licenses for the number of temporarily issued rights K1 are issued, the controller 11 determines that there is a temporarily issued license. If it is determined that there is a temporarily issued license (S27: YES), the process proceeds to step S28. On the other hand, it is determined that there is no temporarily issued license (S27: NO), the process proceeds to step S29.

In step S28, the controller 11 subtracts the number of temporarily issued rights K1 from an additionally purchased right number N3. Specifically, the controller 11 updates the right number "N3" to "N3−K1".

In step S29, the controller 11 adds the additionally purchased right number N3 to the number of owned rights N1. Specifically, the controller 11 updates the right number "N1" to "N1+N3". When the license is additionally purchased, the controller 11 executes the process illustrated in FIG. 8 on the basis of the updated number of owned rights N1.

Meanwhile, the number of users N2 may fluctuate during the valid period of the license. FIG. 10 schematically illustrates an example of license consumption when the number of users N2 fluctuates. If the number of users N2 is preset for each month, that is, if the number of users N2 in each future month is known, in the process illustrated in FIG. 8, the controller 11 acquires the number of users N2 for each target month as a fluctuation value and executes the process. On the other hand, if the number of users N2 is not preset for each month, that is, if the number of users N2 in each future month is unknown, the controller 11 acquires the current number of users N2 as a fixed value, as the number of users N2 for each target month and executes the process. That is, a calculated value in this case is a current provisional valid period that may change in the future.

Therefore, if the number of users N2 in each future month is unknown, the valid period of the license is recalculated at the beginning of each unit period (for example, at the beginning of a month) or each time the number of users N2 is changed to update the valid period of the license, thereby calculating the final license valid period. For example, in the example illustrated in FIG. 10, if the target month is the 1st month, the controller 11 acquires "10" as the current number of users N2. In addition, the controller 11 acquires "120" as the number of owned rights N1 at this point in time. Then, the controller 11 executes the process of steps S16 to S24 on the basis of the number of users N2 "10". As a result, the controller 11 sets the 12th month as the last month (expiration). That is, in this case, as illustrated in FIG. 3, the last month (expiration) is calculated, assuming that the number of users N2 "10" does not change, and the 12th month is set as the provisional final expiration as the provisional last month (expiration) as of the 1st month. The number of owned rights N1 is generated and decreased by the number of users N2 at the beginning of each month. In the example of FIG. 10, the number of users N2 increases from "10" to "12" in the 3rd month, and the number of users N2 increases from "12" to "15" in the 7th month. In such a case, the valid period of the license is recalculated at the beginning of a unit period (for example, at the beginning of a month) in which the number of users N2 is changed (increased), thereby updating the valid period of the license. For example, a case is described below in which the valid period of the license is calculated with the 7th month as the target month in response to the increase in the number of users N2 from "12" to "15" in the 7th month. The controller 11 sets the 7th month as the target month n and acquires "15" as the current number of users N2. In addition, the number of owned rights N1 is consumed by the number of users N2 at the beginning of each month, and thus the number of owned rights N1 "120" at the beginning of the 1st month has decreases to "52" at the beginning of the 7th month. Therefore, the controller 11 sets "52" as the number of users N2. Then, the controller 11 executes the process of steps S16 to S24. As a result, the controller 11 sets the 10th month as the last month (expiration) and temporarily issues 8 licenses (number of temporarily issued rights K1=8) for an insufficient number of the license, as illustrated in FIG. 10. In the example of FIG. 10, a case has been described in which if the number of users N increases during the license period, the valid period of the license is recalculated to update the valid period of the license, and the final valid period of the license is thereby shortened compared with the license period at the beginning of license purchase (standard license period). However, on the contrary, if the number of users N decreases during the license period, a same algorithm is used to update the valid period of the license, and the final valid period of the license is thereby extended compared with the license period at the beginning of license purchase (standard license period). As described above, if the number of users N2 increases or decreases and the information of the users registered by the user information register 111 is updated, the valid period setter 112 updates the valid period on the basis of the updated information of the users.

Here, when the valid period is updated in such a manner that the expiration of the valid period is advanced as described above, the notifier 115 may notify the license management apparatus 1 or the user terminal 2 of information indicating that the expiration of the valid period is advanced. This allows the user or the administrator to recognize that the expiration of the valid period expected at the time of license purchase has been advanced, and that it is necessary to make the additional purchase of the license earlier than originally planned. The notifier 115 is an example of the third notifier of the present invention.

As described above, the license management apparatus 1 according to the present embodiment subtracts the number of users N2 from the number of owned rights Ni for each unit period, and uses, a first unit period which is an earliest unit period in which the number of owned rights N1 is expected to be insufficient with respect to the number of rights (the number of users N2) in the unit period, as a last unit period in which the content can be used by the plurality of users included in the group, to set same expiration of the valid period for all of the plurality of users. As a result, it is possible to avoid variations in license expirations among users. Consequently, when issuing a license to use content to a plurality of users in a group, it is possible to adapt to the replacement of the plurality of users in a group during the license period and to easily manage update and the like of the license.

The license management system of the present invention is not limited to the abovementioned embodiment. As another embodiment, the valid period setter 112 may use, the unit period (corresponding to the second unit period of the present invention) which is the unit period immediately before an earliest unit period (corresponding to the first unit period of the present invention) in which the number of owned rights N1 is expected to be insufficient with respect to the number of licenses (the number of users N2) used in the unit period, as a last unit period in which the content can be used by the plurality of users, to set same expiration of the valid period for all of a plurality of users.

For example, in the example illustrated in FIG. 11, if "13" is subtracted from the number of owned rights N1 (N1−N2) for each unit period "one month", there is a shortage of 10 licenses in the 10th month which is the last unit period in which the content can be used. In this case, the valid period setter 112 sets the period from the 1st month to the 9th month to the valid period, and sets, the 9th month which is immediately before the 10th month, to the last month (expiration) of the valid period. In this case, there is a surplus of licenses (three in this case) for the number of owned rights N1 in the 10th month.

If the number of licenses is surplus, the number of owned rights manager 113 stocks licenses for the surplus number of rights (hereinafter referred to as "number of stocked rights S1"). In the example illustrated in FIG. 11, three licenses are insufficient in the 10th month that is the next month following the expiration, and thus the number of owned rights manager 113 stocks three licenses. In addition, when a new license for the group is purchased and the number of rights is newly added, the number of owned rights manager 113 adds a number of stocked rights S1 corresponding to the stocked licenses to a number of the added rights. For example, if 120 licenses are newly added to the group, the number of owned rights manager 113 adds the number of stocked rights S1 "3" to "120". As a result, the number of owned rights manager 113 sets "123" as the number of owned rights N1 as of the 10th month and executes a consumption process of the license after the 10th month.

In addition, the notifier 115 notifies the license management apparatus 1 or the user terminal 2 of information indicating that licenses for the surplus number of the rights have been stocked or information for prompting addition (for example, purchase) of new rights to use the content when licenses for the surplus number of the rights (number of stocked rights S1) are stocked by the number of owned rights manager 113. The notifier 115 is an example of the second notifier of the present invention.

Figure 12:
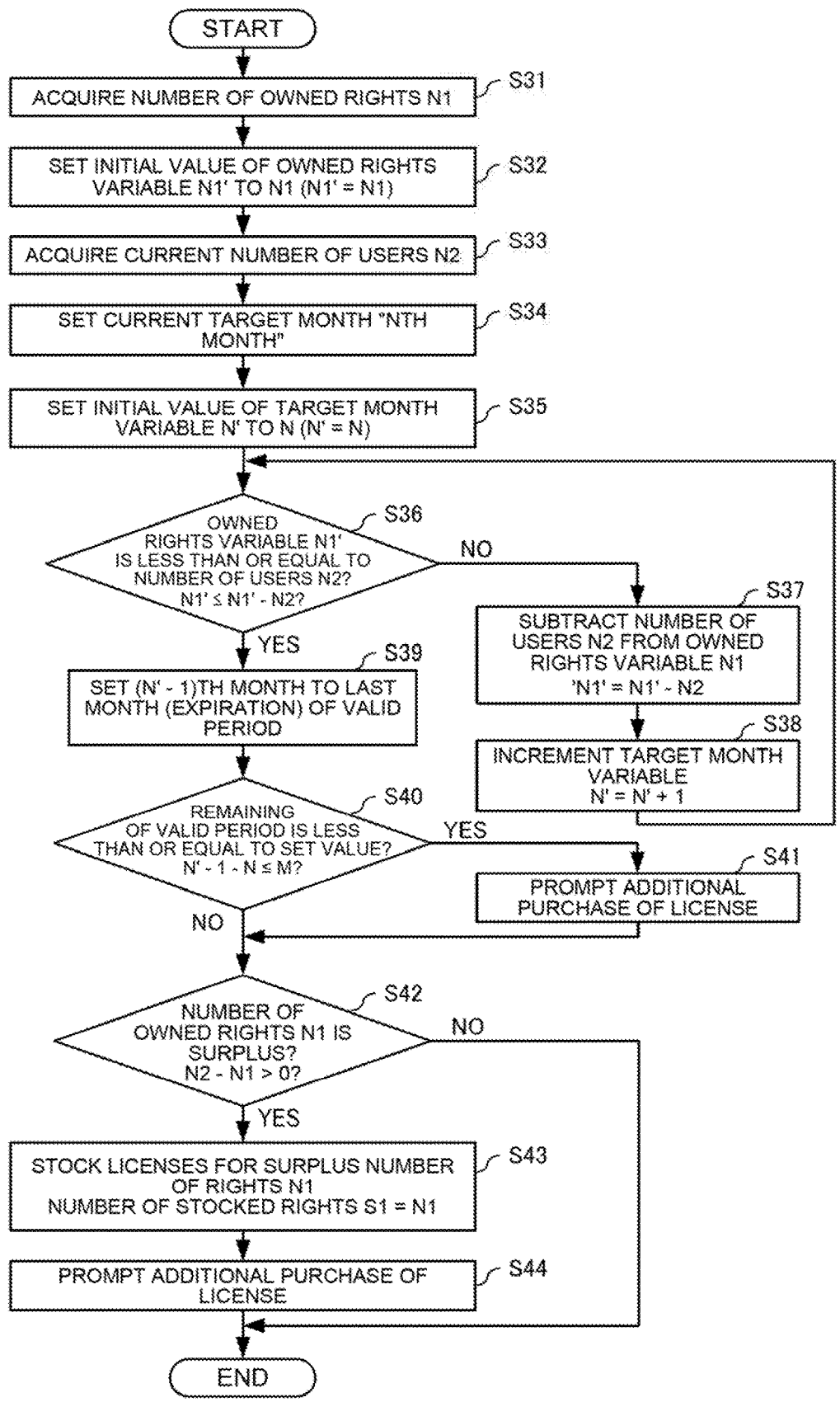
FIG. 12 is a flowchart for explaining an example of a procedure of a license management process in the license management system according to the embodiment of the present invention.
Figure 13:
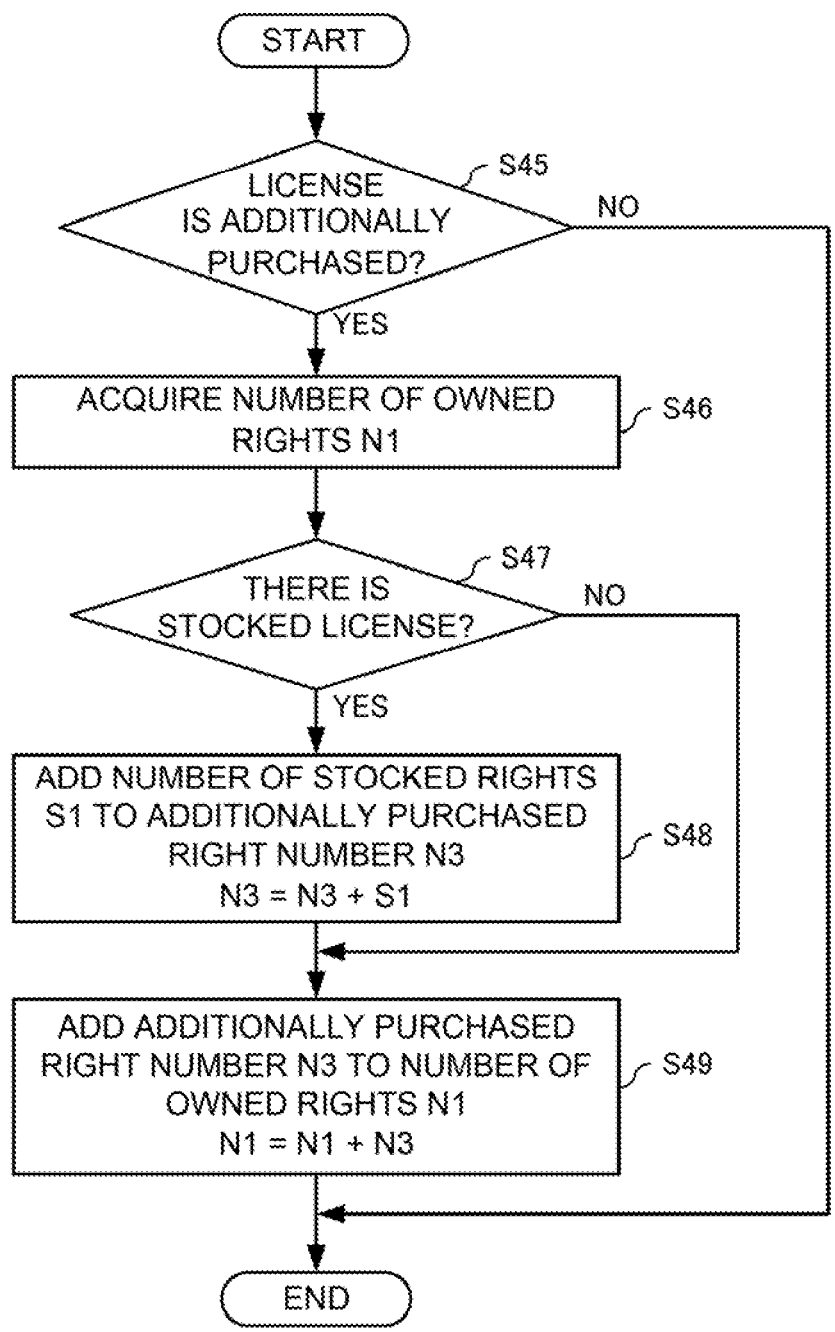
FIG. 13 is a flowchart for explaining an example of a procedure of a license management process in the license management system according to the embodiment of the present invention.

FIGS. 12 and 13 illustrate an example of the license management process corresponding to the abovementioned other embodiment. The process different from the license management process illustrated in FIGS. 8 and 9 will be described below, and the description of the same process will be omitted.

In step S39 of FIG. 12, the controller 11 sets an (n'−1)th month which is immediately before a month corresponding to the target month variable n', to the last month (expiration) of the valid period of the license. In the example illustrated in FIG. 11, the controller 11 sets the 9th month to the last month (expiration). Step S39 is an example of the setting a valid period of the present invention.

In step S42, the controller 11 determines whether the number of owned rights N1 is surplus. If it is determined that the number of owned rights N1 is surplus (S42: YES), that is, if the number of owned rights N1 is less than the number of users N2, the process proceeds to step S43. On the other hand, if it is determined that the number of owned rights N1 is not surplus (S42: NO), that is, if the number of owned rights N1 is more than or equal to the number of users N2, the process ends.

In step S43, the controller 11 stocks licenses for the surplus number of the rights (the number of stocked rights S1=N1). In the above example, the controller 11 stocks three licenses (S1=3).

Next, in step S47 of FIG. 13, the controller 11 determines whether there is a stocked license. For example, in step S43 in FIG. 12, if the licenses for the number of stocked rights S1 are stocked, the controller 11 determines that there is a stocked license. If it is determined that there is a stocked license (S47: YES), the process proceeds to step S48. On the other hand, it is determined that there is no stocked license (S47: NO), the process proceeds to step S49.

In step S48, the controller 11 adds the number of stocked rights S1 to the additionally purchased right number N3. Specifically, the controller 11 updates the right number "N3" to "N3+S1".

Even in the other embodiment described above, it is possible to avoid variations in license expirations among users. Consequently, it is possible to adapt to the replacement of a plurality of users in a group during a license period and to easily manage update and the like of a license.

As described above, in the license management system 100 of the present invention, if the quotient is "a" and the remainder is "b" when the number of owned rights N1 is divided by the number of users N2, the controller 11 may set an a-th month as the expiration (last month) of the valid period and temporarily issue insufficient "N2−b" licenses (the number of temporarily issued rights K1=N2−b). In addition, if the quotient is "a" and the remainder is "b" when the number of owned rights N1 is divided by the number of users N2, the controller 11 may set the (a−1)th month as the expiration (last month) of the valid period and stock surplus b licenses (the number of stocked rights S1=b).

The license management system 100 according to the present invention can be configured by freely combining each of the embodiments described above, or by appropriately modifying each of the embodiments or omitting some of the embodiments within the scope of the invention described in each claim.

REFERENCES SIGNS LIST

1: license management apparatus
2: user terminal
11: controller
12: storage
13: operator/displayer
14: communicator
100: license management system
111: user information register
112: valid period setter
113: number of owned rights manager
114: number of users setter
115: notifier

What is claimed is:

1. A license management system for managing licenses for a plurality of users in a group to use a content, the license management system comprising:
a processor; and
a non-transitory computer-readable medium having instructions stored thereon that, when executed by the processor, cause the license management system to:
register information of the plurality of users in the group who use the content;
set a valid period in which the plurality of users can use the content, on a basis of a preset unit period;
manage a number of owned rights in the group based on a number of rights for one user of the plurality of users to use the content for the preset unit period;
set a number of the plurality of users who use the content in the preset unit period, on a basis of the information of the plurality of users in the group;
subtract a number of rights corresponding to the number of the plurality of users in the group from the number of owned rights for each unit period;
set an earliest unit period in which the number of owned rights is expected to be insufficient with respect to the number of rights in the earliest unit period as a last unit period in which the content can be used by at least portions of the plurality of users, such that the expiration of the valid period for all of the plurality of users is the same; and
issue rights for the insufficient number of rights for the last unit period.

2. The license management system according to claim 1, wherein the instructions, when executed by the processor, further cause the license management system to subtract, when rights to use the content are newly added, a number of the rights temporarily issued from a number of the rights added.

3. The license management system according to claim 1, wherein the instructions, when executed by the processor, further cause the license management system to indicate that the rights for the insufficient number of rights have been temporarily issued or prompt addition of new rights to use the content when the rights for the insufficient number of rights are temporarily issued.

4. The license management system according to claim 1, wherein the instructions, when executed by the processor, further cause the license management system to update, when the information of the plurality of users in the group is updated, the valid period based on the updated information of the plurality of users in the group.

5. The license management system according to claim 4, wherein the instructions, when executed by the processor, further cause the license management system to indicate that the expiration of the valid period has been advanced when the valid period is updated to advance the expiration of the valid period.

6. A license management system for managing licenses for a plurality of users in a group to use a content, the license management system comprising:
  a processor; and
  a non-transitory computer-readable medium having instructions stored thereon that, when executed by the processor, cause the license management system to:
    register information of the plurality of users in the group who use the content;
    set a valid period in which the plurality of users can use the content, on a basis of a preset unit period;
    manage a number of owned rights in the group based on a number of rights for one user of the plurality of users to use the content for the preset unit period;
    set a number of the plurality of users who use the content in the preset unit period, on a basis of the information of the plurality of users in the group;
    subtract a number of rights corresponding to the number of the plurality of users in the group from the number of owned rights for each unit period;
    set a unit period immediately before an earliest unit period in which the number of owned rights is expected to be insufficient with respect to the number of rights in the unit period as a last unit period in which the content can be used by at least portions of the plurality of users, such that the expiration of the valid period for all of the plurality of users is the same; and
    stock rights for the surplus number of rights of the earliest unit period in which the number of owned rights is expected to be insufficient with respect to the number of rights in the unit period.

7. The license management system according to claim 6, wherein the instructions, when executed by the processor, further cause the license management system to add, when rights to use the content are newly added, a number of the rights stocked to a number of the rights added.

8. The license management system according to claim 6, wherein the instructions, when executed by the processor, further cause the license management system to indicate that the rights for the surplus number of rights have been stocked or prompt addition of new rights to use the content when the rights for the surplus number of rights are stocked.

* * * * *